United States Patent
Bentley et al.

(10) Patent No.: US 8,934,342 B2
(45) Date of Patent: Jan. 13, 2015

(54) SYSTEM AND METHOD FOR OBVIATING A MEET-ME CONFERENCE HUB

(75) Inventors: Jon L. Bentley, New Providence, NJ (US); Parameshwaran Krishnan, Basking Ridge, NJ (US); Peter Tarle, Ontario (CA)

(73) Assignee: Avaya Inc., Basking Ridge, NJ (US)

( * ) Notice: Subject to any disclaimer, the term of this patent is extended or adjusted under 35 U.S.C. 154(b) by 162 days.

(21) Appl. No.: 13/587,959

(22) Filed: Aug. 17, 2012

(65) Prior Publication Data
US 2014/0050104 A1 Feb. 20, 2014

(51) Int. Cl.
*H04L 1/00* (2006.01)
*H04L 12/16* (2006.01)
*H04L 12/28* (2006.01)

(52) U.S. Cl.
USPC ............ 370/235; 370/261; 370/270; 370/401

(58) Field of Classification Search
CPC ... H04L 12/18; H04L 12/1822; H04L 65/605; H04M 3/567; H04M 2207/20; H04N 7/14; H04N 7/15; H04N 7/152
USPC .......... 370/229–240, 252, 259–271, 400–402
See application file for complete search history.

(56) References Cited

U.S. PATENT DOCUMENTS

| | | | | |
|---|---|---|---|---|
| 6,754,322 B1 * | 6/2004 | Bushnell | ................... | 379/202.01 |
| 7,076,048 B2 * | 7/2006 | Lee et al. | ................... | 379/265.01 |
| 7,715,541 B2 * | 5/2010 | Arrant et al. | ............. | 379/202.01 |
| 8,238,536 B1 * | 8/2012 | Kavulak et al. | .......... | 379/202.01 |
| 8,300,558 B2 * | 10/2012 | Buford et al. | .................. | 370/260 |
| 8,659,636 B2 * | 2/2014 | Firestone et al. | .......... | 348/14.08 |
| 2001/0053213 A1 * | 12/2001 | Truong et al. | ............ | 379/202.01 |
| 2011/0019593 A1 * | 1/2011 | Stephen et al. | ............... | 370/260 |

* cited by examiner

*Primary Examiner* — Tri H Phan
(74) *Attorney, Agent, or Firm* — Maldjian Law Group LLC; John Maldjian; Alexander D. Walter

(57) ABSTRACT

System and method to obviate a conferencing hub, in one embodiment the method including: subscribing to a meet-me conference call that comprises a plurality of endpoints; monitoring for a triggering condition related to the meet-me conference call; and if the triggering condition is triggered then, for each endpoint of the conference call, redirecting a media stream produced by the endpoint from the conferencing hub to another endpoint. In another embodiment, the method includes: receiving a call from a first endpoint to join a new meet-me conference; waiting a predetermined waiting-time; if no other endpoints have joined the meet-me conference during the waiting-time, disconnecting the first endpoint from the meet-me conference in order to obviate the meet-me conference hub; receiving a call from a second endpoint to join the meet-me conference; calling back the first endpoint; and bridging together the first endpoint and the second endpoint to reassemble the meet-me conference.

14 Claims, 5 Drawing Sheets

400

SYSTEM AND METHOD FOR OBVIATING A MEET-ME CONFERENCE HUB

BACKGROUND

1. Field of the Invention

Embodiments of the present invention generally relate to obviating a meet-me conference hub, and, in particular, to a system and method for replacing the meet-me conference hub with direct call(s) among participants.

2. Description of Related Art

An electronic conference ("e-conference") is a conference, communication session, or the like among a plurality of participants, in which participants communicate electronically. An e-conference may be organized as an "ad-hoc" conference or as a "meet-me" conference. Ad-hoc conferences are established on-the-fly by current participants who are able to reach out to add new participants to the conference, without the use of a central hub. In contrast, a meet-me conference provides a common meeting place (e.g., a conference hub) where all participants can electronically assemble. Meet-me conferences are typically relatively more convenient and offer more features and services, while ad-hoc conferences can offer relatively increased efficiency, quality, shorter latency and reliability.

Existing e-conference solutions force participants to choose a conferencing method at setup time, and to continue using the chosen conferencing method during the duration of the e-conference, despite changes in participation levels or feature needs of the participants.

Therefore, a need exists to provide more flexible e-conference communications, in order to provide an improved and dynamic balance of features, services, efficiency, quality, latency and reliability, and ultimately improved customer satisfaction.

SUMMARY

Embodiments in accordance with the present invention provide a combination of the convenience and power of meet-me conferences while maintaining the efficiency, quality, latency and reliability of ad-hoc conferences, and may switch between the types of conferences as needs change.

System and method to obviate a conferencing hub, in one embodiment the method including: subscribing to a meet-me conference call that comprises a plurality of endpoints; monitoring for a triggering condition related to the meet-me conference call; and if the triggering condition is triggered then, for each endpoint of the conference call, redirecting a media stream produced by the endpoint from the conferencing hub to another endpoint.

In another embodiment, the method includes: receiving a call from a first endpoint to join a new meet-me conference; waiting a predetermined waiting time; if no other endpoints have joined the meet-me conference during the waiting time, disconnecting the first endpoint from the meet-me conference in order to obviate the meet-me conference hub; receiving a call from a second endpoint to join the meet-me conference; calling back the first endpoint; and bridging together the first endpoint and the second endpoint to reassemble the meet-me conference.

In another embodiment, the method includes: for a previously-obviated conferencing hub, retaining identification information about an associated direct conference call; subscribing to the direct conference call; receiving a request from an endpoint of the direct conference call to use a feature of the previously-obviated conferencing hub; for each endpoint of the conference call, redirecting a media stream produced by the endpoint to the conferencing hub; and providing the feature to the endpoint.

In another embodiment, a system to obviate a conferencing hub includes: a conferencing hub, which includes: a conference server in communication through a communication network, the conference server configured to provide conferencing service to one or more endpoints; a media server in communication with the conference server, the media server configured to receive and transmit media flows from and to the one or more endpoints; an obviating decision server in communication with the conference server, the obviating decision server configured to monitor communication among the one or more endpoints for a triggering condition; and a session manager in communication with the conference server, the media server, and the obviating decision server, wherein the session manager configured to control the system, wherein if the obviating decision server detects the triggering condition then the session manager is configured to obviate the conferencing hub.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
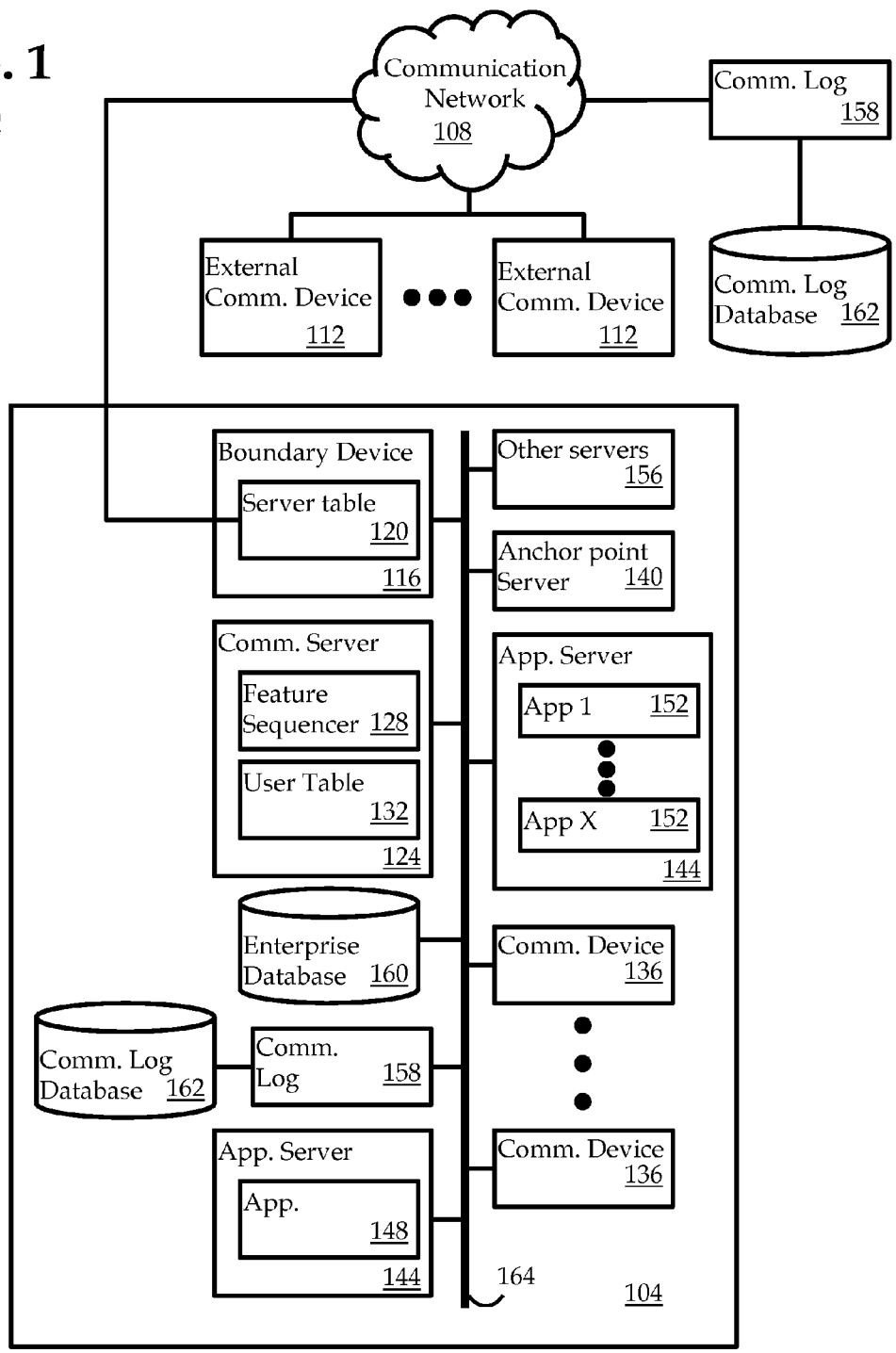
FIG. 1 is a block diagram depicting a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize e-conferencing capabilities.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

Embodiments of the present invention generally relate to e-conferences, and, in particular, to a system and method for providing an improved and changeable balance of the convenience and power of meet-me conferences, while maintaining the efficiency, quality, latency and reliability of ad-hoc conferences. Embodiments in accordance with the present invention may switch between the types of conferences as needs change.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, VoIP Gateway, SBC and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical data storage medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1 depicts a communication system 100 that may be usable with an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, any other unified communications device, and the like.

The communication network 108 may be packet-switched and/or circuit-switched. An exemplary communication network 108 includes, without limitation, a Wide Area Network (WAN), the Internet, a Public Switched Telephone Network (PSTN), a Plain Old Telephone Service (POTS) network, a cellular communications network, or combinations thereof. In one configuration, the communication network 108 is a public network supporting the IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148 and 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a user's sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

A meet-me conferencing hub is typically a media server that mixes media streams. Embodiments in accordance with the present invention are applicable to different types of media depending on the capability of the endpoints. In particular, embodiments are applicable to audio, video and web conferencing streams.

A meet-me conference is established by participants calling into a meet-me conference hub (i.e., bridge). The hub may be located remotely from any one of the participants. Since the cost, if any, to participants may not directly depend on distance to the hub, the tendency is to provide one hub or one access telephone number for nationwide coverage. However, long distance connections use relatively more network resources such as route capacity and router capacity than shorter connections and may be more expensive in price, more subject to failure, and the like.

The hub itself adds overhead to maintain the meet-me conference and to provide optional features and services that the participants may want to use. The overhead of the meet-me conference call may include at least a cost of the calls by the participants, and a potential degradation of transmission quality, latency and reliability from connecting through the hub. The customer's perception of cost, quality, latency and reliability may negatively affect their satisfaction with the communication services.

The hub and longer transmission paths affect transmission quality at least because additional codec conversions may be involved. Latency may be affected because additional network elements may involve additional queues and queueing delays. Reliability may be affected because as the number of network elements and links between them increase, there are more potential points of failure.

In contrast, a direct call between the two participants may have been less expensive, of higher quality, shorter latency and have greater reliability, even if it is less convenient and offers fewer features or services.

In some usage scenarios of the background art, e-conference participants establish a meet-me conference call through the hub, but the conference call may be attended by only two participants, each of whom has called into the hub to join the meet-me conference call. The two participants are subject to overhead imposed by the hub, but they may not use any of the features or services offered by the meet-me conference. One study found that approximately 38% of meet-me conferences have just one or two participants. In certain scenarios such as these, it may be advantageous to convert these meet-me conferences into a direct call between the two participants.

Embodiments in accordance with the present invention obviate the need for a hub in circumstances such as those described above, and to replace it automatically with a direct call while substantially retaining the benefits of a meet-me conference as used by the participants. We use the standard definition of "obviate," which refers to "remove," "avoid" and/or "prevent."

For example, suppose that a first participant has a call scheduled with a second participant. If the participants conduct their call as a conventional call, with one participant as a caller and the other participant as a callee, then the caller has freedom to call from any location (e.g., an office, conference room, cell or home phone, etc.) but the callee is bound to receive the call at a designated telephone number (e.g., at the office), or must go through extra steps to forward incoming calls to another telephone number (e.g., a cell number). The callee may not be available at the precise moment the caller calls (e.g., the callee may have stepped out, or is taking another call, out of cell range, etc.), thereby risking a possibility that the call will go to voice mail causing inefficiency and confusion.

In contrast, if the participants communicate via a meet-me conference, then the participants each have the freedom to call a single meet-me number from any location and any telephone number.

For participants located on, e.g., the East and West Coasts, a meet-me conference hub located in the center of the country does not add significantly to the total mileage of the transmission compared to that of a direct call, wherein total mileage is used as an approximation or indicator of the cost, quality, latency and reliability of the communication connection.

However, suppose that both the first and second participants are located on the East Coast, or even within a more limited geographic area (e.g., 10 miles apart in a sales territory). If both participants use the same meet-me conference hub in the center of the country, the participants may be making two 1500-mile media paths to implement a 10-mile connection. Assuming again that physical distance serve as a proxy for network distances, connection through a hub that is relatively distant from the participants compared to the distance between the participants themselves may lead to increases in cost and decreases in quality, latency and reliability.

If conferencing participants want to use additional features provided by a hub-based meet-me conference (e.g., recording the call, counting participants, announcing new participants by name, etc.), then the participants need to use the meet-me hub to access those additional features. In contrast, if the participants are using the meet-me conference hub only for connectivity, then replacing the hub with a direct call could decrease cost and free up system resources (e.g., bandwidth usage) while increasing quality, latency and reliability.

Embodiments in accordance with the present invention provide a system and method for participants of a meet-me conference to obviate the meet-me conference hub when it is appropriate and advantageous to do so. Several scenarios (i.e., triggering conditions) are described below in which the hub might be removed, and then the disclosure turns to a description of making that decision.

Assume that two participants at respective endpoints are communicating by use of a meet-me conference call through a hub. In an embodiment in accordance with the present invention, the hub is removed (i.e., obviated) by replacing the hub with a direct call between the two endpoints, thereby reducing an overall length of communication links used to communicatively connect the participants and, by proxy, reducing the cost while potentially increasing the quality, latency and reliability of the communication between participants.

Cost savings achievable by obviating a meet-me conference call between two participants can be generalized in many contexts to meet-me conference calls with more that two participants. For example, suppose a meet-me conference call includes three participants at respective endpoints calling into a single hub. Obviating the meet-me hub is accomplished by reconfiguring the connectivity from that of a hub connected to the endpoints to that of a three-way call from a selected endpoint to the remaining endpoints. This process can be generalized to "n" participants and solved by modeling the problem as a Steiner tree problem, as discussed in further detail below.

Figure 2:
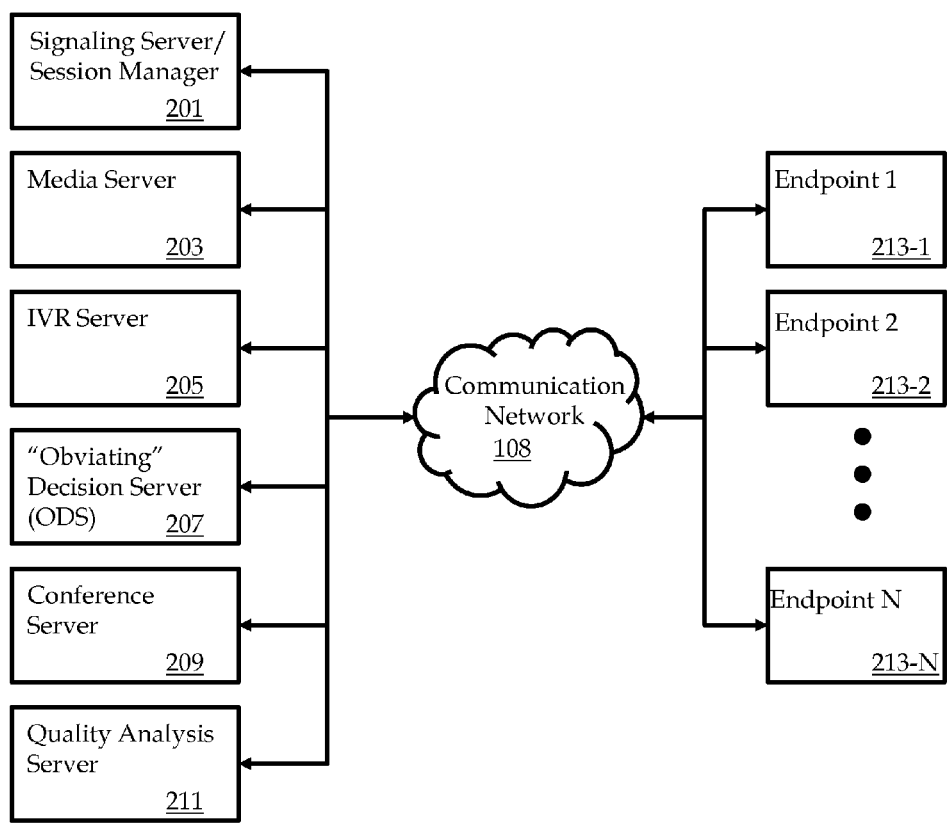
FIG. 2 is a block diagram depicting at a higher level of abstraction a system in accordance with an embodiment of the present invention.

FIG. 2 illustrates at a high level of abstraction a system 200 usable to implement a meet-me conference call that will later be obviated by embodiments in accordance with the present invention. System 200 includes on a server side a signaling server/session manager 201, a media server 203, an IVR server 205, an "obviating" decision server 207, a conference server 209, and a quality analysis server 211, interconnected as shown with each other and/or communication network 108 (e.g., Internet, PSTN, etc.). On an end user side are one endpoints 213-1, 213-2, . . . 213-N, which may be collectively referred to herein as endpoints 213.

Embodiments may combine two or more of IVR server 205, conference server 209 and signaling server 201 into a single server or unit operating with appropriate program instructions. Alternatively, one or more of IVR server 205, conference server 209 and signaling server 201 may remain implemented as separate servers or units, with session manager 201 orchestrating their interaction with each other and with the other portions of system 200.

Figure 3:
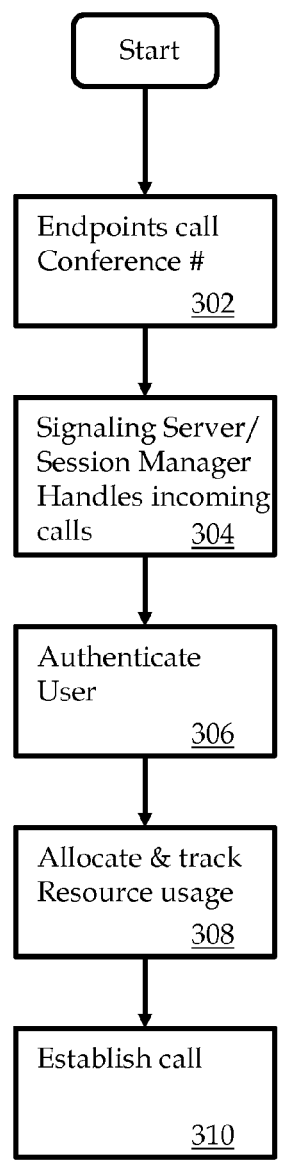
FIG. 3 illustrates a method of establishing a meet-me conference.

FIG. 3 illustrates at a high level of abstraction a process 300 usable to implement a meet-me conference call by use of system 200, which will later be obviated by embodiments in accordance with the present invention. In step 302, the endpoints 213 call a conference number. For example, two endpoints 213-1 and 213-2 may call a conference number 888-555-1000 using a SIP protocol.

At step 304 the call will be answered and handled by signaling server/session manager 201 and/or conference server 209. Signaling server/session manager 201 may typically include signaling server functionality. Conference server 209 may have information specific to a conference (e.g., whether a participant can mute all attendees). The features of Signaling server/session manager 201 and conference server 209 may be implemented as one server or may be implemented as separate feature servers. For example, signaling server/session manager 201 and/or conference server 209 may keep track that Conference ID 123456 is currently running with endpoints 213-1 and 213-2, with its internal identifier 1fg776898977356bbhg, and that the conference is using audio server 75 with audio port 54467 and video server 93 with port 77665.

At step 306 signaling server/session manager 201 and/or conference server 209 may redirect the endpoints to IVR server 205, which may collect the conference number and authenticate user of endpoint 213.

At step 308, resource usage may be allocated and tracked by conference server 209 and/or session manager 201 and/or conference server 209 and then the call is established at step 310. For example, allocation and tracking may include that certain features (e.g., recording, participant availability) are available to all participants and that other features (e.g., remove participant, mute) are available only to the user and endpoint 213-1 who logged in as a moderator.

Resource allocation may include sending signaling messages to the endpoints that are calling in (e.g., endpoints 213-1 and 213-2), directing them to send their media to media server 203, and sending port assigned for the conference to endpoints 213-1 and 213-2. Media server 203 where media mixing may be done may also be referred to herein as a Meet-me hub. Resource tracking may continue for the duration of the call.

Removing media server 203 does not necessarily change the signaling path and server. The endpoints 213 may continue to send and received signaling messages to the signaling server/session manager 201, but the media server 203 may be removed from system 200.

In another embodiment in accordance with the present invention, endpoints 213 may include sufficient intelligence in order to facilitate sending signaling messages via peer-to-peer networking until the endpoint 213 recognizes that a condition requires a change, and involves a signaling server at that time.

Figure 4:
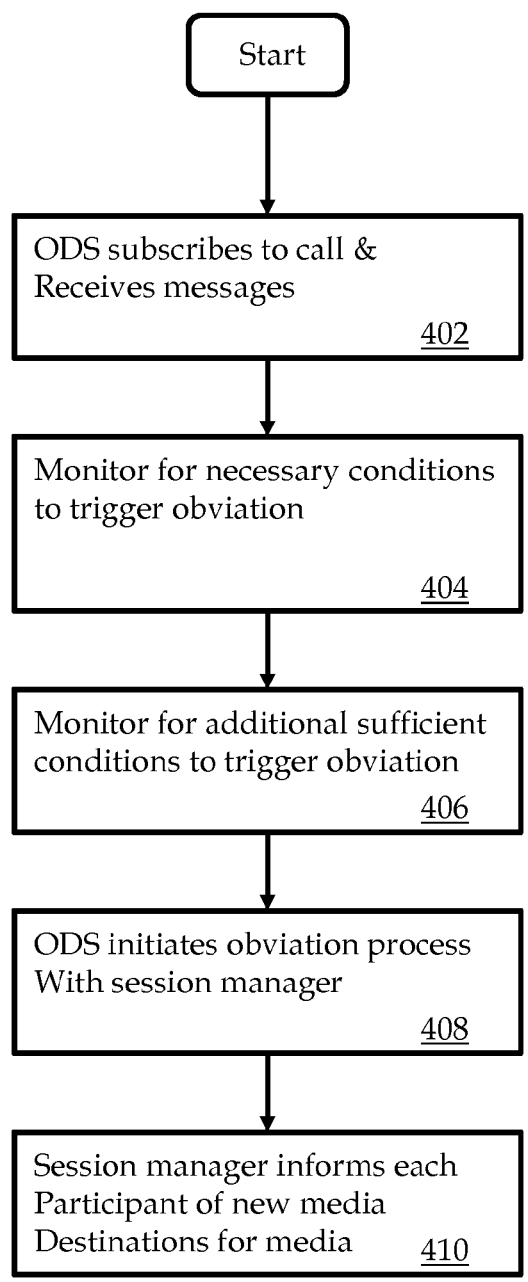
FIG. 4 illustrates at a high level of abstraction a method of obviating a meet-me conference hub, in accordance with an embodiment of the present invention.

FIG. 4 illustrates at a high level of abstraction a process 400 for obviating a meet-me hub, in accordance with an embodiment of the invention. Although process 400 is illustrated by use of two conference participants 213-1 and 213-2, persons of skill in the art will recognize how to adapt process 400 to obviate a meet-me conference hub when there are more or fewer than two participants of the meet-me conference call.

At step 402, "Obviating" Decision Server (ODS) 207 subscribes to the meet-me conference using the internal identifier (e.g., 1fg776898977356bbhg) in order to monitor the meet-me conference. ODS 207 then will receive messages related to conference status (e.g., SIP INFO messages). The subscription and messages may be sent by signaling server/session manager 201.

At step 404, after a predetermined amount of conference time has elapsed, ODS 207 may determine that only two participants (e.g., endpoints 213-1 and 213-2) are participating in the meet-me conference, and that the participants are using media hubs 75 and 93 for audio and video respectively.

At step 406, ODS 207 compares the current state of the meet-me conference to the policy, and ODS 207 determines that the meet-me hub (for audio and/or video) for this conference should be obviated. In some situations it may be desirable to obviate one media stream but not the other. For example, consider a situation in which there are four participants in a call, but only two of which have video capability. In this exemplary situation, all four participants should receive the audio media stream but only the two participants with video capability should receive the video media stream. Therefore, in this example, the video hub may be obviated but the audio hub will be kept as a meet me hub. In another example, separately obviating an audio media hub and a video media hub may be useful if media services such as media recording are used for only one media type (e.g., audio or video) but not for the other media type (e.g., video or audio). Obviating the media hub associated with at least one media stream would provide at least some bandwidth savings. It is preferable to maintain synchronization between the two media streams.

At step 408, ODS 207 informs session manager 201 that the conference hub of this meet-me conference should be obviated.

At step 410, session manager 201 invokes an application module (e.g., application server 148 and application 144 of FIG. 1) that will send signaling messages to the participating endpoints (e.g., endpoints 213-1 and 213-2). The signaling messages inform each participating endpoint of the new media destinations to use for communicating directly with other participants of the conference call. Further media streams from the participating endpoints will be redirected to the respective new media destination. For example, endpoint 213-1 may be informed that its remote media destination for audio and video should be changed to endpoint 213-2 ports 34563 and 47659, respectively. Similarly, endpoint 213-2 may be informed that its remote media destination for audio and video should be changed to endpoint 213-1 ports 23543 and 54346 respectively. The endpoints 213-1 and 213-2 will redirect their media destinations accordingly. Step 410 continues if there are additional participating endpoints for which the destinations should be changed. Upon completion of the change of destinations for all participating endpoints, the media hub will have been obviated.

Figure 5:
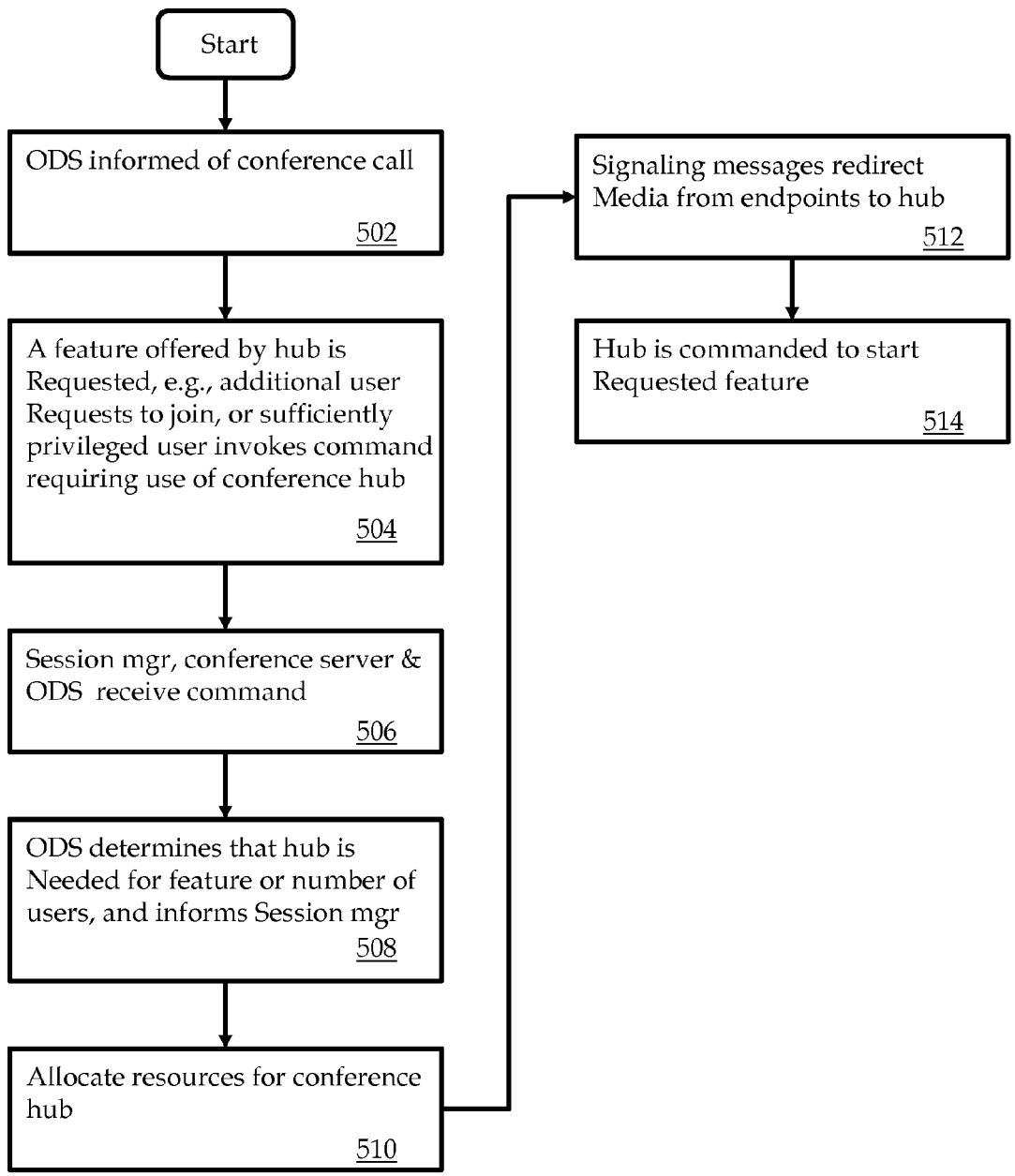
FIG. 5 illustrates a method of adding a meet-me conference hub to a direct conference call, in accordance with an embodiment of the present invention.

FIG. 5 illustrates at a high level of abstraction a process 500 for un-obviating a meet-me conference hub, i.e., introducing or restoring a meet-me hub to a conference in which the meet-me hub had been previously obviated, in accordance with an embodiment of the invention. A meet-me hub may be added if, for example, one of the participants wants to utilize a feature offered by the meet-me conference hub. Although process 500 is illustrated by use of two conference participants at endpoints 213-1 and 213-2, persons of skill in the art will recognize how to adapt process 500 to add a meet-me conference hub when there are more or fewer than two participants attempting to convert their call into a meet-me conference call. Alternatively, a subset of meet-me conference hub capabilities (e.g., a media hub) may be added if the subset is adequate to provide the features requested by the users. Either type of hub may be referred to in process 500 as a conference hub unless the context of usage clearly indicates otherwise. Because the conference involves participants and endpoints 213-1 and 213-2 and a conference hub already having been obviated, the media from endpoint 213-1 may be sent directly to endpoint 213-2, and vice-versa.

At step 502, ODS 207 is informed of the conference call. In one embodiment, ODS 207 may use SIP SUBSCRIBE in order to subscribe to a direct conference, e.g., by use of a conference ID number such as 1fg776898977356bbhg. In another embodiment, the conference application itself may manage the informing of ODS 207 with knowledge of the conferencing topology at any time. Upon successful completion of step 502, ODS 207 may receive messages (e.g., SIP NOTIFY messages) relating to conference status and conference events. Alternatively, ODS 207 may be implemented within the meet-me conferencing application rather than as a separate service, and therefore would not need to exchange signaling messages between ODS 207 and the meet-me conferencing application. Because the direct conference call had been previously set up as a meet-me conference call that was later obviated, ODS 207 is aware of the direct conference call.

At step 504, a feature offered by the meet-me conference hub may be requested, such as an additional user requesting to join the conference, or such as a user having sufficient privileges (e.g., a moderator using endpoint 213-1) who may invoke a command (e.g., press a key sequence) in order to request a feature offered by the meet-me conference hub, such as conference recording.

At step 506, session manager 201, conference server 209 and ODS 207 receive the user command to request a feature offered by the meet-me conference hub.

At step 508, ODS 207 may determine that the feature requested by the user a meet-me conference hub is needed for this feature. ODS 207 informs session manager 201 which in turn invokes an application module (e.g., application server 148 and application 144 of FIG. 1). Alternatively, session manager 201 may invoke a feature server directly since session manager 201 knows that the meet me conference hub was obviated earlier.

At step 510, resources are allocated for the conference hub.

At step 512, signaling messages are sent to endpoint 213-1 and endpoint 213-2, redirecting their media to the conference hub.

At step 514, a signaling message is sent to the conference hub to start the feature requested by one of the users of endpoints 213.

In the three-participant scenario, the original three calls from the endpoints 213 to a meet-me conference hub are replaced by two calls between a designated endpoint and the remaining two other endpoints. The total distance of the calls for three or more participants may or may not be decreased, depending upon the choice of the designated endpoint used to connect to the remaining endpoints. The designated endpoint may be selected as being generally conceptually central to the physical location of other endpoints. Alternatively, the designated endpoint may be selected as one known to be connecting through a major network node having many low-cost and/or high-reliability connections to other endpoints. This process may be generalized by replacing "n" calls to a hub with "n−1" calls among "n" participants when doing so can decrease cost and latency, and increase quality and reliability.

More precise selection of the designated endpoint for a particular configuration of endpoint locations may be solved by modeling the problem as a Steiner tree problem, which is known in the art as a problem in combinatorial optimization, such that the shortest interconnect for a given set of objects is sought. "Shortest" may be in terms of physical distance, or connection costs, etc.

In another scenario, suppose that a meet-me conference call includes only a single participant. Such a scenario may occur at least for a short duration when the first caller to a meet-me conference calls in and connects to the hub, or when a meeting is set as "tentative" and only one person chooses to attend, and so forth. Typically, the first caller may be placed on hold by the meet-me conference until at least a second participant calls in. Furthermore, participants may wait on hold until a designated meet-me conference participant (e.g., organizer, moderator, etc.) connects to the meet-me conference. Embodiments in accordance with the present invention, after a pre-determined amount of time, may provide to the participants on hold an opportunity to sign off temporarily but receive a callback when either other participants have joined the conference or when a designated participant (e.g., organizer or moderator) has joined the conference.

In another scenario, a direct call between two or more participants may be converted into a meet-me conference call. Such conversion may be useful if certain features offered by the meet-me conferencing hub are needed, or if a hub is invoked by a policy setting such as having more participants.

Therefore, obviating the need for a meet-me conference hub may be particularly useful in scenarios when: (a) there are only two participants of the meet-me conference; (b) there is only one participant, at least temporarily, of the meet-me conference; and (c) a three-party meet-me conference. In some scenarios as discussed above, embodiments in accordance with the present invention may be extended to larger conferences, depending upon the mixing capacity of the endpoint(s).

Operation of the meet-me conference hub may be controlled or set by policy. Embodiments in accordance with the present invention make a decision to obviate a meet-me conference hub in one of several ways. In one embodiment, the decision to obviate a hub may be made unilaterally by a participant. Policy options may include allowing any party on the call to do the obviating, or allowing only the organizer/moderator to obviate. A system administrator or moderator may be able to modify the policy for a particular conference or a set of conferences. Some users or conference organizers may choose the most conservative choice, i.e., any person may deny obviating. Other users or conference organizers may opt for cost savings, i.e., implementing a policy in which any person can force obviating. Another policy may be that the obviating could be put it up to a vote by participants. For example, a participant may believe that all participants of the meet-me conference have already joined, and there are no plans to use any features supported exclusively by the meet-me conferencing hub. In such a situation, the participant may type a code such as *94 to have a server such as application server 144 of FIG. 1 convert the meet-me conference call to a direct call.

In another embodiments in accordance with the present invention, a decision to obviate a meet-me conferencing hub may be made by a server, such as application server 144 of FIG. 1, based upon metrics or parameters related to activity during the call, usage of conferencing features, and the like. For example, if no new participants have joined the meet-me conference in the previous 15 minutes and no participants have used any of the conferencing features, then application server 144 may initiate conversion of the meet-me conference into a direct call.

The parameters used when determining whether to obviate a meet-me hub may be made a matter of policy. For example, after 15 minutes of no additional participants and no feature use, application server 144 may suggest a conversion that at least one participant can choose to accept or to decline. Deadlock or disagreement may also be handled as a matter of policy.

The policy may further include that after 30 minutes of usage without additional participants and without usage of conferencing features, application server 144 may make a conversion automatically.

In another embodiment in accordance with the present invention, one participant may propose to convert the call into a direct call, and the other participant(s) may accept or decline the conversion.

In some embodiments in accordance with the present invention, the conversion from a meet-me conference to a direct call may preclude future conference attendees from joining the call on their own accord, without being joined to the call by one of the current participants. In some embodiments in accordance with the present invention, if a new participant wishes to join the call, then the call may revert back to a meet-me conference. In some embodiments in accordance with the present invention, if a new participant wishes to join the call, application server 144 of FIG. 1 may transform the direct "n" party call into a direct "n+1" party call (e.g., from a two-party call into a three-party call).

In some embodiments in accordance with the present invention, application server 144 and/or quality analysis server 211 may monitor the quality of the calls, using standard quality measures known in the art, and make the transformation if and when the quality decreases.

In some embodiments in accordance with the present invention, instead of obviating a meet-me conferencing hub by removing the hub after it is determined that the hub is not needed, the hub may be obviated by avoiding using a hub at all until, e.g., a feature of the hub is needed or a predetermined minimum number of participants join the conference. For example, until a third or fourth, etc., participant joins a conference, the signaling server 201 ensures that the hub is not involved in the call. The signaling server may decide to use the meet-me conferencing hub only if more than a predetermined number of participants join (e.g., two or three), or if some specific feature such as recording is invoked by the participants. In accordance with an embodiment of the present invention, a method of obviating a conferencing hub may include receiving notification that at meet-me conference call is being requested or set up, intercepting join requests from at least the first two callers to the meet-me conference, and directly joining together the media streams to/from the callers. If additional callers (e.g., a third caller) call to join the meet-me conference, and if by them joining the meet-me conference call the call membership is still less than or equal to the maximum number of participants for direct calls (e.g., a maximum of three participants), then the additional caller(s) will be directly joined to the call, optionally with one of the callers being a designated endpoint as described herein. When the meet-me conferencing hub can no longer be obviated (e.g., a triggering condition occurs such as too many callers, or a conferencing hub feature is needed, etc.), then the conferencing hub can be added by redirecting media streams from being routed to/from endpoints directly, to being routed to/from the conferencing hub.

If a meet-me conference call has already been transformed into a direct call, situations may occur in which a late-arriving participant wishes to join the call. In some embodiments in accordance with the present invention, the direct call may be extended to the late-arriving participant, such that the direct call continues as a direct call. In order to accommodate such a late-arriving participant, the conference call may exist as a "ghost entity" that is not actively consuming bandwidth. In other embodiments in accordance with the present invention, the direct call may be treated by application server 144 as a request or directive to re-establish the meet-me conference call. The late-arriving participant may then be joined to the call as all participants are reconnected through the meet-me conferencing hub.

In other embodiments in accordance with the present invention, any time the media flows can be accommodated without a centralized media server/hub, a hub will not be allocated. This includes conferences that expand to need a hub (i.e. add the hub), and/or contract to not need a hub (i.e. remove the hub). The media plane will determine whether the media server 203 in a hub is required, substantially independent of the control plane.

In some embodiments in accordance with the present invention, a callback feature may be used to create a "persistent conference." The persistent conference may continue intermittently for an extended period of time (e.g., hours or days or longer). When the persistent conference conversation wanes and all parties have dropped off, no calls are made by application server 144. However, if a participant calls the meet-me conferencing hub telephone number, then some or all of the former participants may receive callbacks in order to join them to the meet-me conference call. The former participants who receive callbacks may include all of the former participants who participated at any time in the conference call, or only the former participants who participated within a pre-determined ending of the previous conference call (e.g., within one minute of the last former participant to drop off), or another selected subset.

In some embodiments in accordance with the present invention, direct calls may revert to a meet-me conference if features offered by the meet-me hub are needed, or if the conference size grows too large, or to attempt to improve quality. Going from a meet-me conference to a direct call decreases edge length and may thereby improve quality, whereas going from direct to meet-me usually increases edge length, but the longer edge length may be compensated for by higher quality mixing.

Embodiments in accordance with the present invention may analyze additional information in order to provide better service. For example, examining the history of an ongoing conference call (e.g., the history of a recurring status conference call) might suggest a rapid transition to a direct call if, for example: the recurring call seldom or never uses any features of a meet-me conference; or if the ongoing conference call often or always has been converted into a direct call in the past. Conversely, delaying a transition from a meet-me conference to a direct call may be appropriate under some circumstances, such as if the ongoing conference call has a history of quickly reverting from a direct call back to a meet-me conference call. Embodiments in accordance with the present invention may also be able to access scheduling data sources such as Microsoft Calendar in order to determine, e.g., how many people are actively planning to attend the conference, so that a decision regarding setting up the call as a direct call or a meet-me conferencing call may initially be made more appropriately.

Converting a meet-me conference call to a direct call risks a potential loss of privacy, e.g., by some telephone numbers being displayed on Caller ID. Embodiments in accordance with the present invention may preserve anonymity by suppressing in the signaling server a display of identity information (e.g., caller-ID) at the participants' terminals.

A call into a conference bridge often will connect a participant to an interactive voice response ("IVR") system that will authenticate the participant. The IVR system could also be handled locally or handled in the IVR system of a local switch in some implementations. Signaling messages may then set up a media streams appropriately. For example, instead of Session Initiation Protocol ("SIP")/Session Description Protocol ("SDP") messages that set up a media stream from an endpoint to a media server, the messages could instead set up a media stream directly between endpoints. In the event that the call is moved from the meet-me conferencing hub (i.e., bridge) to be a direct call, SIP REINVITES can be used to indicate a change in the endpoint to which the media must be directed. The signaling server could indicate the called party to be the bridge identifier to each of the participants.

Mixing media streams can be set up similarly via signaling messages. For this, the signaling server could incorporate knowledge of the endpoint capabilities. For example, not all endpoints in a conference may have sufficient mixing abilities. The signaling server could choose the endpoint that has sufficient mixing capability when setting up mixing. It can also incorporate other knowledge, e.g., bandwidth usage at each of the sites that host the endpoints, when setting up the mixing. SIP messages can be used to indicate endpoint capability to the signaling server.

Embodiments of the present invention include a system having one or more processing units coupled to one or more memories. The one or more memories may be configured to store software that, when executed by the one or more processing unit, allows obviating a meet-me conferencing hub and/or restoring it when determined to be advantageous, at least by use of processes described herein, including at least in FIGS. 3-5, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to obviate a conferencing hub, comprising:
   subscribing to a meet-me conference call that comprises a plurality of endpoints;
   monitoring for a triggering condition related to the meet-me conference call; and
   if the triggering condition is triggered then, for each endpoint of the conference call, redirecting a media stream produced by the endpoint from the conferencing hub to another endpoint.

2. The method of claim 1, wherein the triggering condition comprises lack of usage of a conferencing hub feature for at least a predetermined length of time.

3. The method of claim 2, wherein the triggering condition further comprises no additional endpoints joining the meet-me conference call within a predetermined period of time.

4. The method of claim 1, wherein the triggering condition comprises call quality below a predetermined threshold.

5. The method of claim 1, wherein the triggering condition comprises call cost above a predetermined threshold.

6. The method of claim 1, wherein the triggering condition comprises a condition based upon a historical usage pattern by at least one endpoint.

7. The method of claim 1, wherein an endpoint may restore the obviated conferencing hub.

8. The method of claim 1, wherein the endpoints comprise sufficient intelligence to facilitate a transmission of signaling messages via a peer-to-peer network.

9. The method of claim 1, wherein redirecting a media stream comprises informing each endpoint of a media destination to use for communication directly with other participants of the meet-me conference call.

10. The method of claim 9, wherein the step of informing is performed by a session manager.

11. The method of claim 1, wherein the plurality of endpoints comprises one designated endpoint and one or more non-designated endpoints.

12. The method of claim 11, further comprising: for each non-designated endpoint, redirecting a media stream produced by the non-designated endpoint from the conferencing hub to the designated endpoint.

13. The method of claim 11, wherein the designated endpoint is selected by use of a Steiner Tree process.

14. A system, comprising:
  a conferencing hub, comprising:
    a conference server in communication through a communication network, the conference server configured to provide conferencing service to one or more endpoints;
    a media server in communication with the conference server, the media server configured to receive and transmit media flows from and to the one or more endpoints;
    an obviating decision server in communication with the conference server, the obviating decision server configured to monitor communication among the one or more endpoints for a triggering condition; and
    a session manager in communication with the conference server, the media server, and the obviating decision server, wherein the session manager configured to control the system,
  wherein if the obviating decision server detects the triggering condition then the session manager is configured to obviate the conferencing hub.

* * * * *